US008423988B2

(12) United States Patent
Scian et al.

(10) Patent No.: US 8,423,988 B2
(45) Date of Patent: Apr. 16, 2013

(54) SYSTEM AND METHOD FOR REDUCING THE SIZE OF SOFTWARE STORED ON A MOBILE DEVICE

(75) Inventors: Anthony F. Scian, Waterloo (CA); Harry R. Major, Waterloo (CA)

(73) Assignee: Research In Motion Limited, Waterloo (CA)

( * ) Notice: Subject to any disclaimer, the term of this patent is extended or adjusted under 35 U.S.C. 154(b) by 2264 days.

(21) Appl. No.: 10/869,345

(22) Filed: Jun. 16, 2004

(65) Prior Publication Data

US 2004/0260840 A1 Dec. 23, 2004

(30) Foreign Application Priority Data

Jun. 18, 2003 (GB) .................................. 0314201.5

(51) Int. Cl.
*G06F 9/44* (2006.01)
*G06F 7/00* (2006.01)
*G06F 15/16* (2006.01)
(52) U.S. Cl.
USPC ............ 717/168; 717/114; 709/247; 709/203
(58) Field of Classification Search ........................ None
See application file for complete search history.

(56) References Cited

U.S. PATENT DOCUMENTS

| | | | |
|---|---|---|---|
| 5,260,693 A * | 11/1993 | Horsley | 341/67 |
| 5,454,079 A * | 9/1995 | Roper et al. | 709/247 |
| 5,655,122 A | 8/1997 | Wu | |
| 5,805,827 A * | 9/1998 | Chau et al. | 709/247 |
| 5,859,982 A * | 1/1999 | Lindholm | 709/247 |
| 5,940,871 A | 8/1999 | Goyal et al. | |
| 5,951,623 A * | 9/1999 | Reynar et al. | 708/203 |
| 6,332,172 B1 | 12/2001 | Iverson | |
| 6,370,631 B1 * | 4/2002 | Dye | 711/170 |
| 7,840,955 B1 * | 11/2010 | Weathersby et al. | 717/168 |
| 2002/0152247 A1 * | 10/2002 | Sirtori et al. | 708/203 |
| 2003/0030575 A1 * | 2/2003 | Frachtenberg et al. | 341/51 |
| 2004/0260840 A1 * | 12/2004 | Scian et al. | 709/247 |
| 2005/0144326 A1 * | 6/2005 | Sugar et al. | 709/247 |
| 2012/0047498 A1 * | 2/2012 | Motta et al. | 717/171 |

OTHER PUBLICATIONS

Bill Venners, Objects and Java Building Object-Oriented, MUlti-Threaded Applications with Java, [Retrieved online on Dec. 27, 2007 http://web.archive.org/web/20020124044957/www.artima.com/objectsandjava/webuscript/InitCleanup1.html], chapter 4: Initialization and Cleanup, published on online since Jan. 24, 2002, pp. 1-23.*

(Continued)

*Primary Examiner* — Tuan Q. Dam
*Assistant Examiner* — Zheng Wei
(74) *Attorney, Agent, or Firm* — Jones Day (57) ABSTRACT

A system for reducing the size of software for use in a mobile device includes a predictor module and a compression module. The predictor module is operable to apply a predicate to a plurality of software routines that are to be stored in the mobile device. The predicate identifies one or more of the software routines having a pre-determined feature indicative of a software routine that is unlikely to be executed repeatedly on the mobile device. The compression module is configured to compress the identified software routine(s) to generate a compressed software routine(s). After the plurality of software routines have been loaded to the mobile device, the mobile device decompresses the compressed software routine(s) when the compressed software routine(s) is accessed by an execution thread on the mobile device.

27 Claims, 8 Drawing Sheets

OTHER PUBLICATIONS

Online C++ Tutorial, section 7.3: Constructors and Destructors, pp. 1-2; [Retrieved on line on Dec. 27, 2007: http://web.archive.org/web/20011207123904/www.intap.net/~drw/cpp/cpp07_03.htm], published online since Dec. 7, 2001, pp. 1-2.*

Debray et al., Profile-Guided Code Compression, published on Jun. 2002, ACM, pp. 95-105.*

Lefurgy et al., Reducing Code Size with Run-time Decompression, published date 2000, pp. 1-10.*

Clauson et al.: "Java Bytecode Compression for Low-End Embedded Systems," ACM Transactions on Programming Languages and Systems, ACM, New York, NY, US, vol. 22, No. 3, May 2000, pp. 471-489, XP008050340, ISSN: 0164-0925.

PR FlyZip SR 3.02, Dec. 2003, Elegant Algorithms Reshapes Product Line of Flyzip Data Compression Utilities for Palm Powered Handhelds and Smartphones, 28 pages http://www.fly-zip.com/flyzip/downloads/FlyZipSR/manual.pdf.

CIPO: Office Action for Application No. 2,471,669 dated Nov. 21, 2012 (2 pages) (D1 reference previously cited).

* cited by examiner

SYSTEM AND METHOD FOR REDUCING THE SIZE OF SOFTWARE STORED ON A MOBILE DEVICE

CROSS-REFERENCE

This application claims the benefit of British Application No. 0314201.5, filed on Jun. 18, 2003, the entire disclosure of which is incorporated herein by reference.

FIELD

The technology described in this patent document relates generally to the field of data compression. More particularly, this document describes a system and method for reducing the size of software stored on a mobile device.

BACKGROUND AND SUMMARY

Systems that compress software routines for storage on a mobile device are known in this art. However, such systems suffer from efficiency concerns, especially when dealing with the limited resources of a mobile device.

In accordance with the teachings described herein, systems and methods are provided for reducing the size of software for use in a mobile device. A predictor module may be used to apply a predicate to a plurality of software routines that are to be stored on the mobile device. The predicate identifies one or more of the software routines having a pre-determined feature indicative of a software routine that is less likely to be executed repeatedly on the mobile device. A compression module may be configured to compress the identified software routine(s) to generate a compressed software routine(s). After the plurality of software routines have been loaded to the mobile device, the mobile device decompresses the compressed software routine(s) when the compressed software routine(s) is accessed on the mobile device.

DETAILED DESCRIPTION

Figure 1:
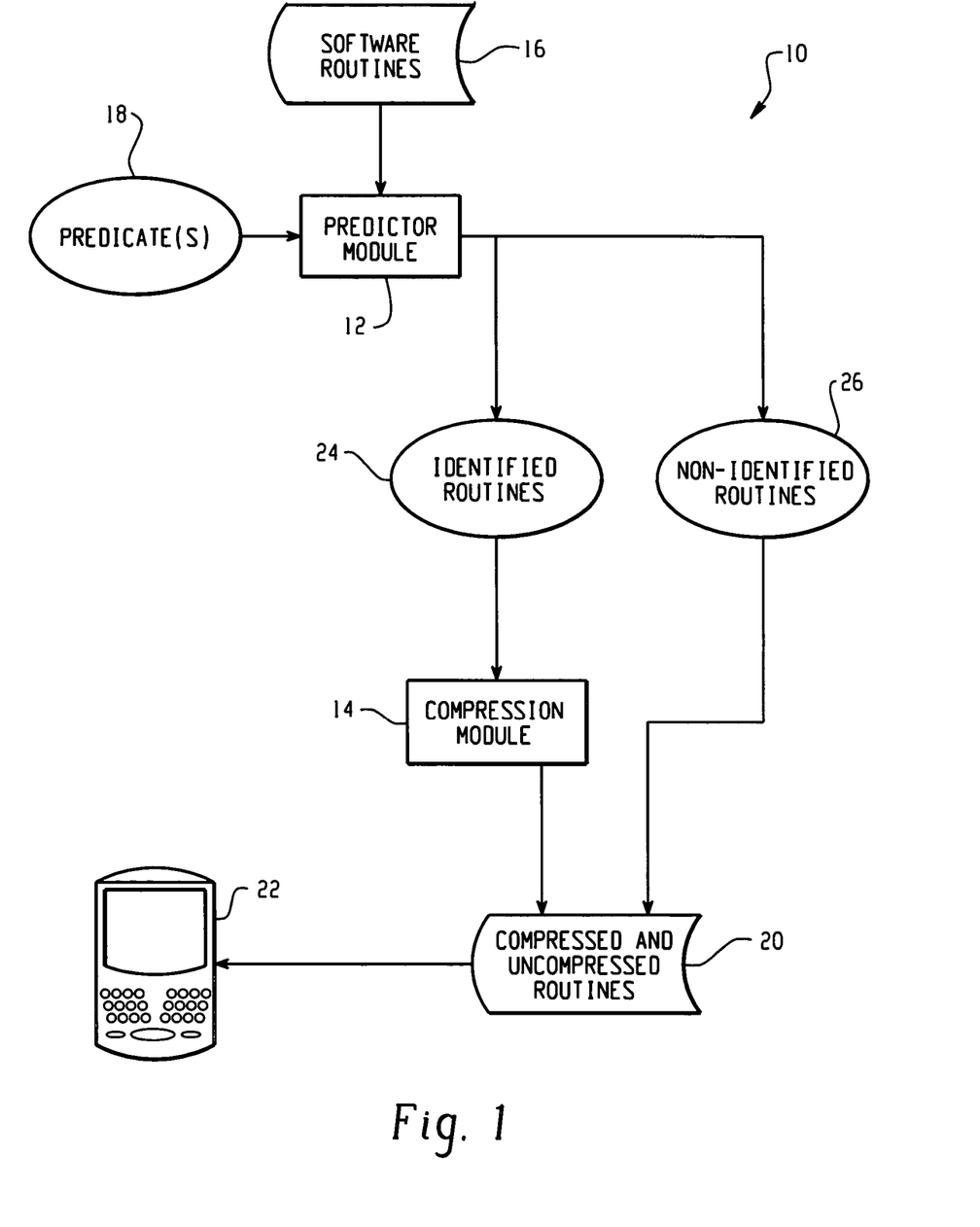
FIG. 1 is a block diagram illustrating an example system for reducing the size of software for use in a mobile device.

With reference now to the drawing figures, FIG. 1 is a block diagram illustrating an example system 10 for reducing the size of software for use in a mobile device 22. The system 10 includes a predictor module 12 and a compression module 14, which may be software modules, hardware modules, or a combination of both. Also illustrated are a plurality of software routines 16 that are to be loaded into memory on the mobile device 22.

In operation, the predictor module 12 applies one or more predicates 18 to the plurality of software routines 16 in order to identify software routines 24 that are unlikely (or at least less likely) to be repeatedly executed on the mobile device 22. The software routines 24 identified by the predictor module 12 are compressed by the compression module 14, and the compressed and uncompressed routines 20 are installed onto the mobile device 22. In this manner, memory space on the mobile device 22 is conserved (without sacrificing significant execution time) by compressing software routines 24 that will not often be executed by the mobile device 22.

The software routines 16 to be installed on the mobile device 22 may be segments or portions of one or more software applications or other contiguous program files (software applications and other types of contiguous program files are collectively referred to herein as "device applications"). A single device application loaded to the mobile device 22 may, therefore, include a plurality of compressed and uncompressed software routines 16. For example, a device application in the Java™ language typically includes classes, each of which may include a number of software routines 16 referred to as methods. It should be understood, however, that software routines 16, as used herein, may also include other segments or portions of a device application. For instance, in one embodiment, a Java class, or any portion of the Java class, may be treated as a separate software routine 16. However, compression at lower sub-program levels, such as at the method level of a Java language program, will typically result in the least amount of disruption to an executing device application.

A predicate 18 is a function that is applied by the predictor module 12 in order to identify a particular feature (or features) within one or more of the software routines 16 that is indicative of a routine that is less likely to be executed by the mobile device 22. The particular feature identified by a predicate 18 may, for example, be chosen based on an analysis of the mobile device 22, the experience of the software developer or mobile device manufacturer, or some other factor relevant to the operation of the software routines 16 on the mobile device 22. For instance, one example predicate 18 may return true for a software routine 16 that initializes static or global variables, such as a static initializer method denoted by <clinit> in a standard Java classfile. A static initializer routine is typically executed only once, and is thus a candidate for compression. The particular feature identified by a predicate 18 could, for example, be a reserved word associated with a certain type of routine. For example, in the case of Java applications, the reserved word <clinit> may be used to identify a static initializer method. It should be understood, however, that other features could also be selected that are indicative of the likelihood of use of a software routine.

In another example, a predicate 18 for use with a device application written in the C++ programming language may be used to identify a static initializer function or a static finalizer function. In the C++ programming language, constructors and destructors for non-local static and global objects in each translation unit are executed when the application starts and terminates, respectively. A constructor is called with a static initializer function, and a destructor is called with a static finalizer function. The object code that controls the construction and destruction of the non-local static and global objects in a C++ translation unit will typically only execute once when the device application is started and once when the application is terminated, and is therefore a candidate for compression.

The predictor module 12 applies the predicate(s) 18 to each of the software routines 16 that are to be loaded onto the mobile device 22. If a predicate 18 returns true for a particular software routine 24, then the identified routine 24 is flagged for compression by the compression module 14. Otherwise, the non-identified routines 26 are copied into a storage location 20 from which the routines 26 are loaded to the mobile device 22 in uncompressed form.

The compression module 14 applies a lossless compression scheme to the identified software routines 24. There are two general types of compression schemes, lossless and lossy. Lossless compression refers to a process in which the original data can be recovered (decompressed) exactly from the compressed data. Lossy compression refers to schemes where the decompressed data is not exactly the same as the original data. A lossless compression scheme is generally used for data that must be accurately maintained, such as a software routine 16. In comparison, lossy compression schemes are generally used for data that already contains a certain amount of noise, such as a photograph, music, or other analog signals that have been put into a digital format. The compression algorithm applied by the compression module 14 is a lossless compression scheme that can preferably compress the instructions in the routine body to a degree that there is an appreciable reduction in the amount of memory space needed to store the routine. One example lossless compression scheme that could be used by the compression module 14 is described in co-owned U.S. Pat. No. 6,075,470, entitled "Block-Wise Adaptive Statistical Data Compressor."

The compressed software routines generated by the compression module 14 are transferred into a storage location 20 along with the uncompressed routines 26. Both the compressed and uncompressed routines 20 may then be loaded into memory on the mobile device 22. The operation of the mobile device 22 to access the compressed and uncompressed routines 20 is described below with reference to FIGS. 2 and 3.

Figure 2:
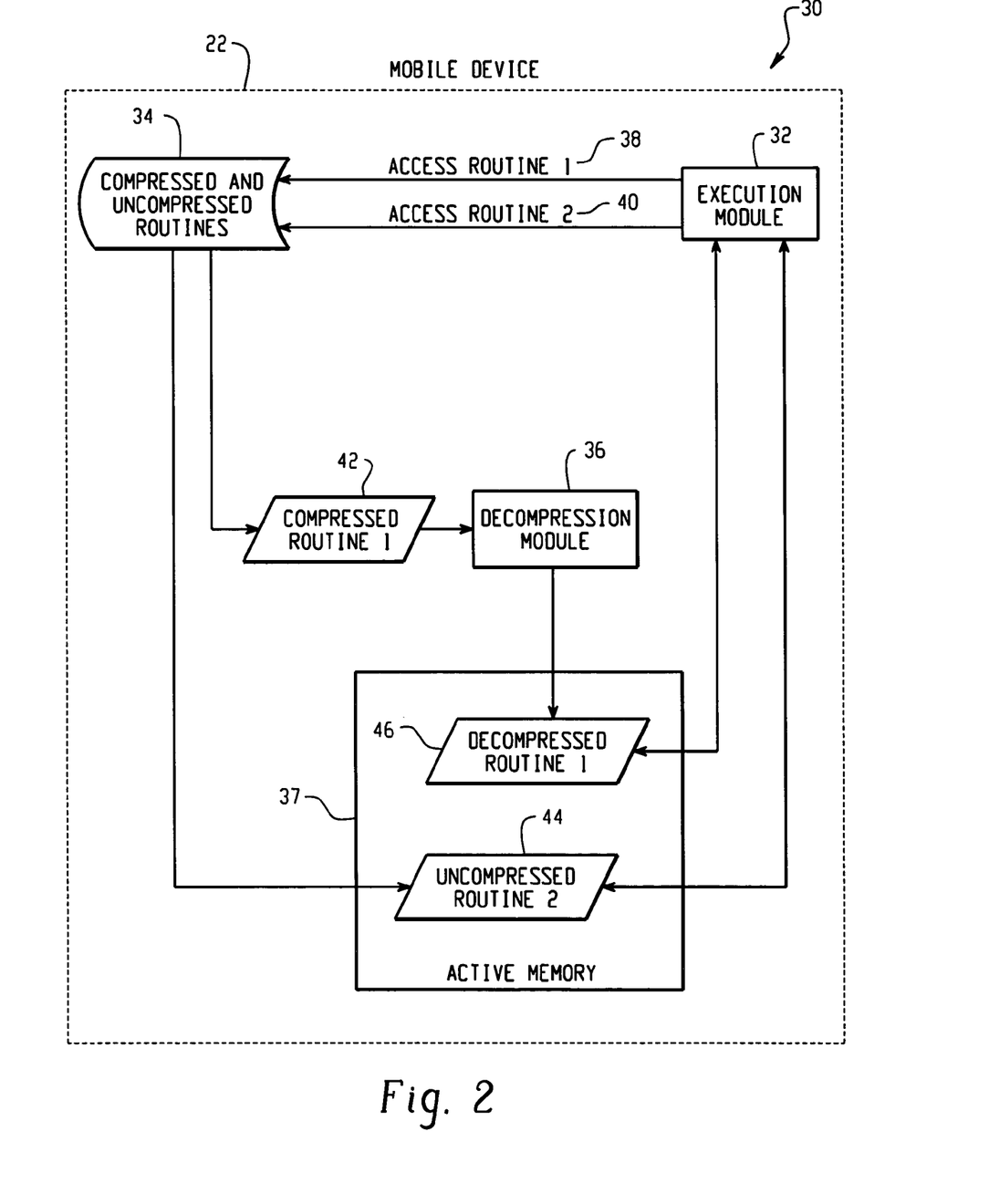
FIG. 2 is a block diagram of an example mobile device for use in the system of FIG. 1.

FIG. 2 is a block diagram 30 of an example mobile device 22 for use in the system 10 of FIG. 1. The mobile device 22 includes an execution module 32, a persistent memory 34 for storing compressed and uncompressed software routines, an active memory 37 for storing executing software routines, and a decompression module 36. In operation, persistent memory space on the mobile device 22 is conserved by storing rarely-used software applications in compressed form, and then decompressing such applications when accessed by the execution module 32.

The execution module 32 may, for example, be a virtual machine executing on a processor in the mobile device 22, but could also be some other type of software or hardware mechanism for executing device applications. The decompression module 36 is preferably a software module that is configured to decompress the compressed software routine(s) stored in the persistent memory 34 in accordance with the compression scheme utilized by the compression module 14 shown in FIG. 1. The persistent memory 34 and active memory 37 may be separate memory devices (as illustrated), but could also be implemented using a single memory device, such as a flash memory.

Execution threads operating on a mobile device may also access the compressed and uncompressed routines. For example, when a compressed routine (Routine 1) stored in persistent memory 34 is accessed 38 by an execution thread from the execution module 32, the compressed routine 42 is decompressed by the decompression module 36 and the resultant decompressed routine 46 is stored to active memory 37. As noted above, the persistent and active memories 34, 37 may, in some embodiments, be implemented using a single memory device. If a single memory device is utilized, then a segment of memory may be reserved for storing and executing decompressed routines 46. In any case, once in active memory 37, the decompressed software routine 46 may then be executed by the execution module 32.

The time delay incurred while decompressing a software routine is preferably acceptable due to the infrequent use of the compressed routines 42. Software routines which are accessed more frequently are stored in uncompressed form, as described above. Thus, when a stored uncompressed routine (Routine 2) is accessed 40, the uncompressed routine 44 may be copied directly into active memory 44 for execution by the execution module 32. Alternatively, if a single memory device is utilized for both persistent and active memory 34, 37, then the uncompressed routine 44 may be executed and stored in the same memory location.

Figure 3:
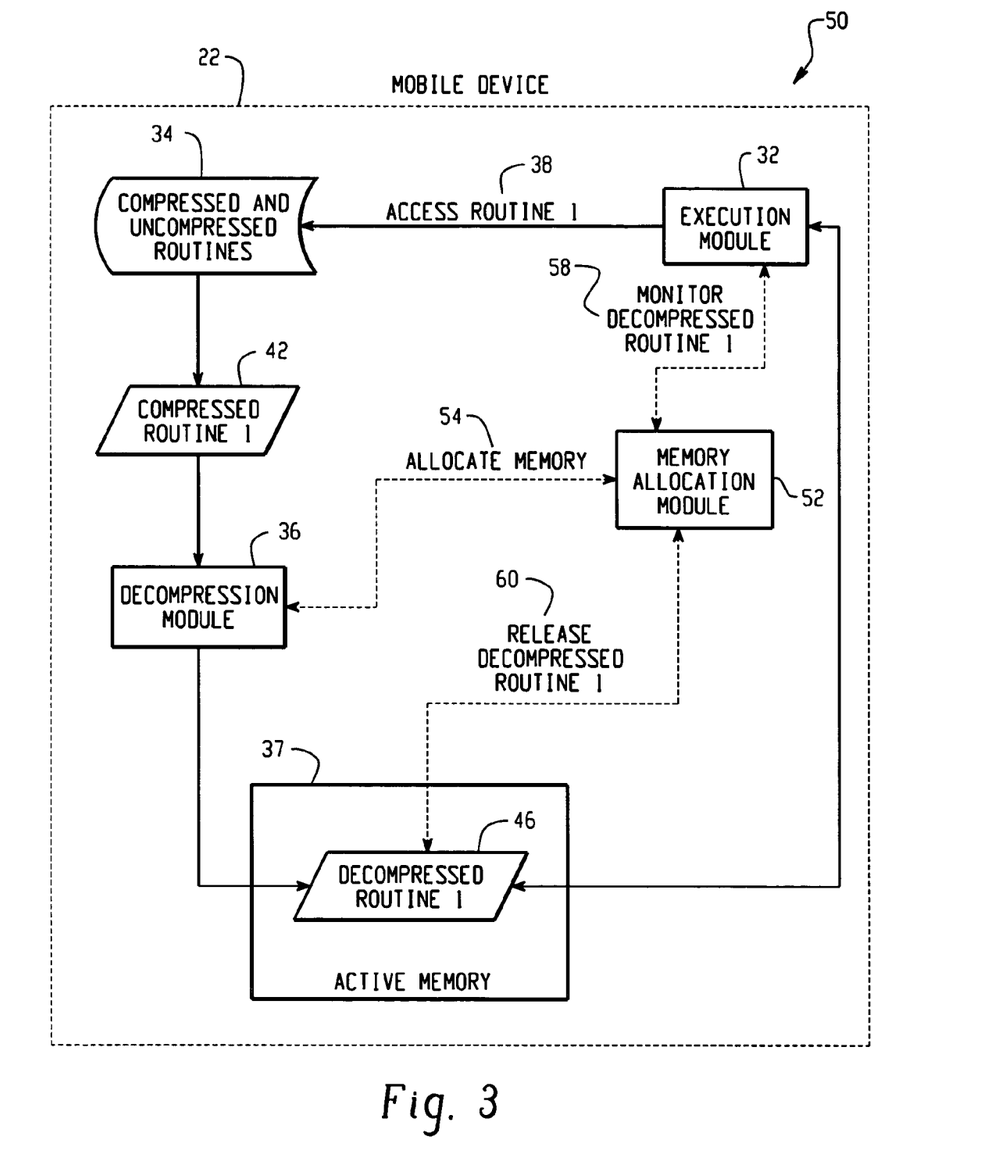
FIG. 3 is another block diagram of the example mobile device of FIG. 2, showing a memory allocation module.

FIG. 3 is block diagram of the mobile device, illustrating an example memory allocation module 52 for the mobile device 22. The memory allocation module 52 may include a software module that controls the storage of decompressed routines 46 in active memory 37.

In operation, when a compressed software routine (Routine 1) is accessed 38 by the execution module 32, the decompression module 36 queries at 54 the memory allocation module 52 for an available location in active memory 37. If sufficient active memory is available, then the memory allocation module 52 assigns a memory location, and the decompression module 36 uses the assigned memory location to store the decompressed routine 46 to active memory 37. If there is insufficient room in active memory 37, then the memory allocation module 52 frees memory space by releasing another routine from active memory 37 based on some pre-selected criteria. In addition, the memory allocation module 52 may also monitor 58 the execution of the decompressed routine 46 by the execution module 32, and release at 60 the routine 46 from active memory 37 once it completes or once the device application that accessed the routine 46 has finished executing. (An example method for controlling the release of decompressed routines from active memory is described below with reference to FIGS. 6 and 7.)

Figure 4:
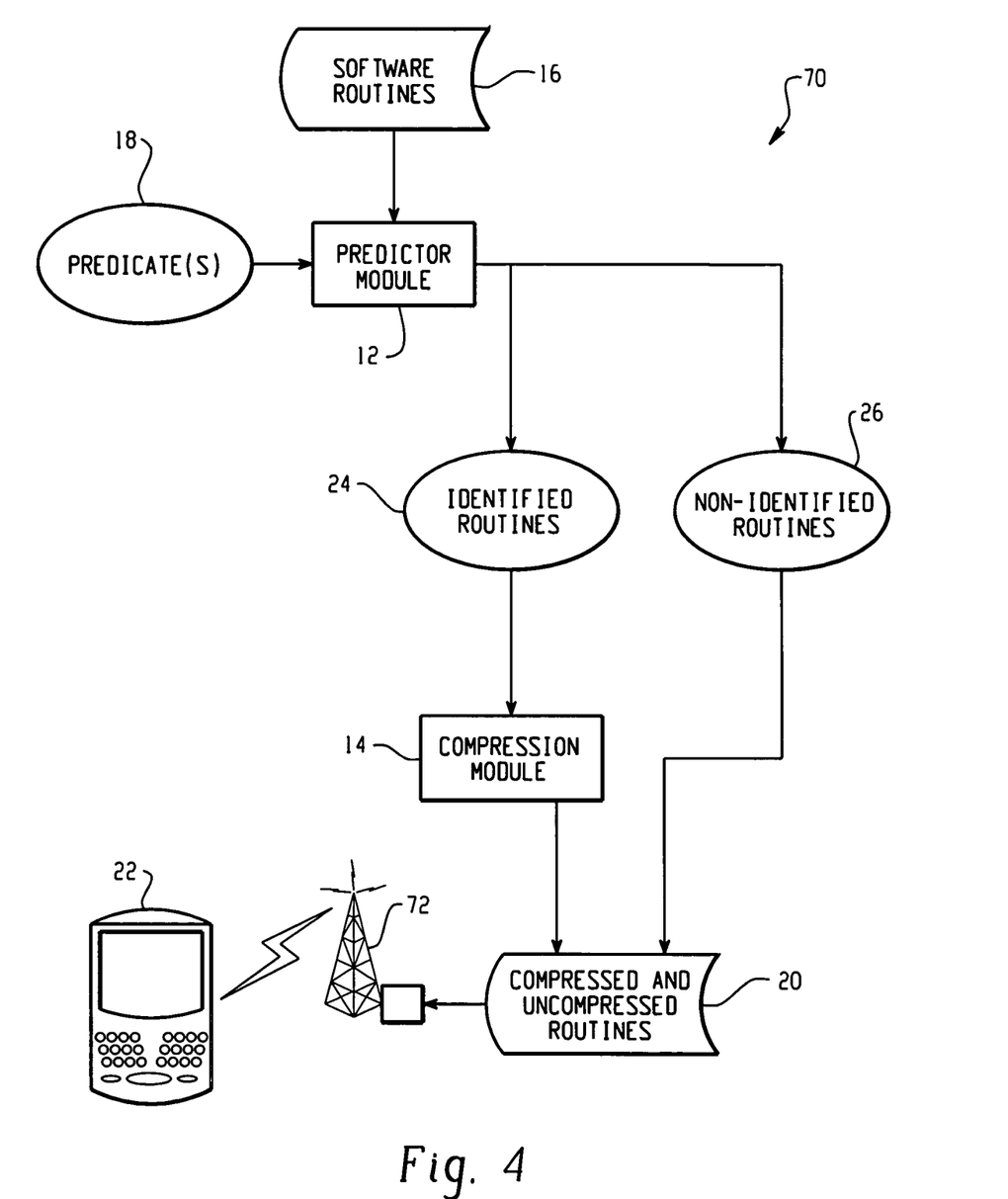
FIG. 4 is a block diagram illustrating a wireless embodiment of the example system of FIG. 1.

FIG. 4 is a block diagram illustrating a wireless embodiment 70 of the example system 10 of FIG. 1. As shown in FIG. 4, the compressed and uncompressed routines 20 are transferred to the wireless device 22 over a wireless network 72. This embodiment 70 may, for example, be used to transfer software updates or new software applications to a mobile device 22 that has already been sold to a consumer.

The mobile device 22 in this wireless embodiment 70 may be any mobile communication device adapted to operate within a wireless network 72, such as a two-way communication device. The operation of the wireless device 22 may vary depending upon the wireless network 72 in which the device 22 is intended to operate. For example, a wireless device 22 that operates in North America may include a communication subsystem designed to operate with the Mobitex™ mobile communication system or the DataTAC™ mobile communication system, whereas a wireless device 22 that operates in Europe may incorporate a General Packet Radio Service (GPRS) communication system.

Figure 5:
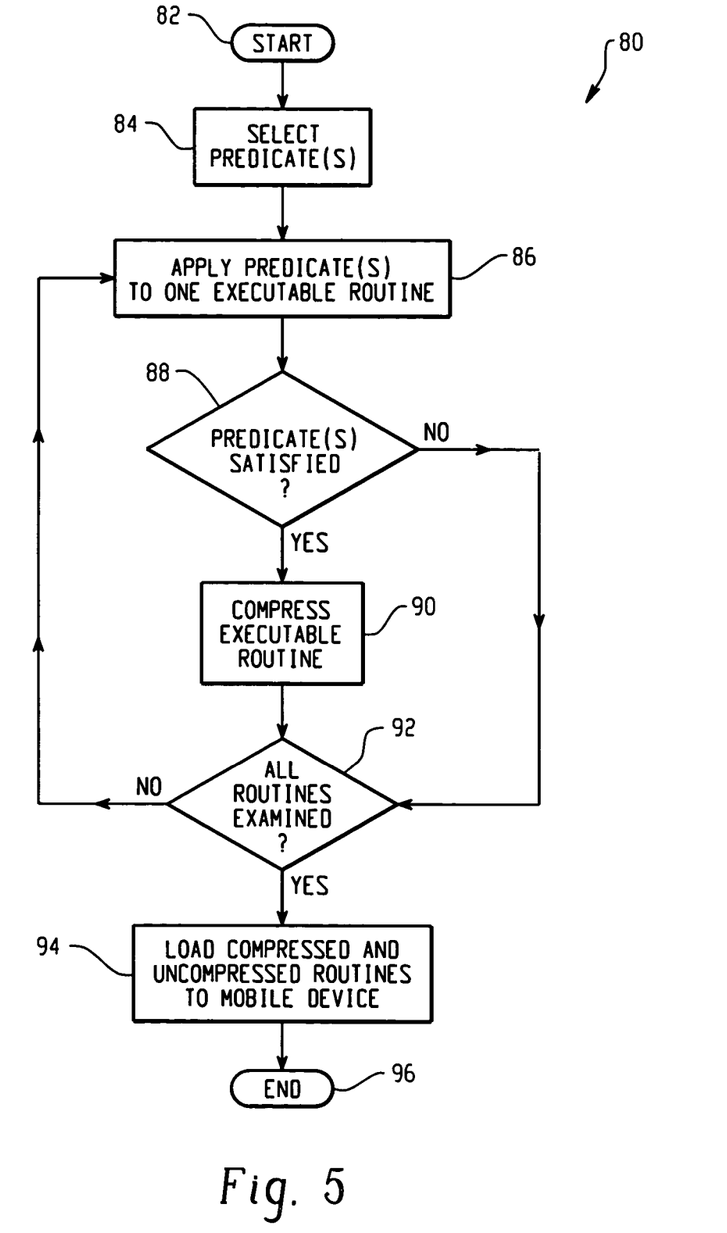
FIGS. 5 and 6 are flow diagrams illustrating an example method for reducing the size of software for use in a mobile device.
Figure 6:
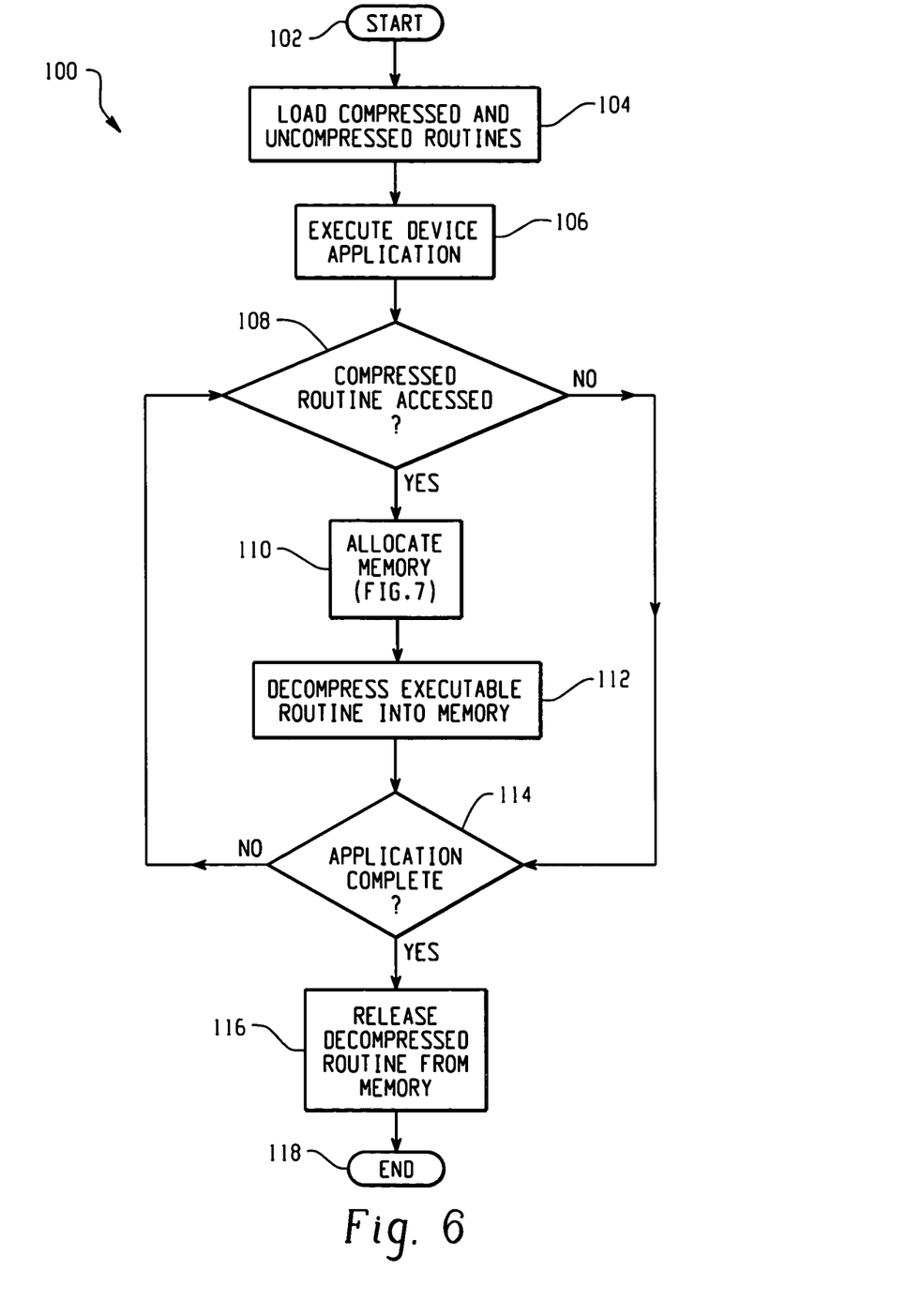

FIGS. 5 and 6 are flow diagrams 80, 100 illustrating example methods for reducing the size of software for use in a mobile device. FIG. 5 illustrates an example method 80 for identifying software routines that are less likely to be repeatedly executed on the mobile device, and for compressing the routines for storage on the mobile device. The method 80 begins at step 82. At step 84, one or more predicates are selected to identify particular software routine features indicative of routines that are less likely to be executed by the mobile device. As noted above with reference to FIG. 1, the predicate(s) selected in step 84 could, for example, include one or more reserved words associated with a type of routine that should not, based on experience or analysis, be executed often on the mobile device. For instance, in a Java application, a predicate may return true for each method containing the reserved word <clinit>.

At step 86, the predicate(s) is applied to a software routine that is to be loaded to the mobile device. If the predicate is not satisfied (e.g., returns false), then the software routine is not compressed and the method skips to step 92. If the predicate is satisfied (e.g., returns true), however, then the software routine is compressed at step 90. Steps 86-90 are then repeated until all the routines have been examined. At step 94, the compressed and uncompressed routines are loaded to the mobile device, and the method ends at step 96

FIG. 6 illustrates an example method 100 for accessing compressed software routines stored on the mobile device. The method begins at step 102. At step 104, compressed and uncompressed software routines are installed on the mobile device, as described above. At step 106, a device application having one or more software routines is executed by the mobile device. If an execution thread from the device application accesses a compressed software routine (step 108), then an active memory location is allocated at step 110 and the software routine is decompressed into the allocated memory at step 112. (See, e.g., FIG. 7) Steps 108, 110 and 112 are repeated until the device application is complete, as determined at step 114. That is, each decompressed software application accessed during the execution of the device application may be retained in active memory until the device application is complete (step 114). Then, once the device application is complete, the decompressed software routine(s) is released from memory at step 116, and the method ends at step 118. Alternatively, the decompressed software routine(s) may be released from active memory as soon as its execution is complete, or may be released from active memory based on some other pre-selected criteria, as described below with reference to FIG. 7.

Figure 7:
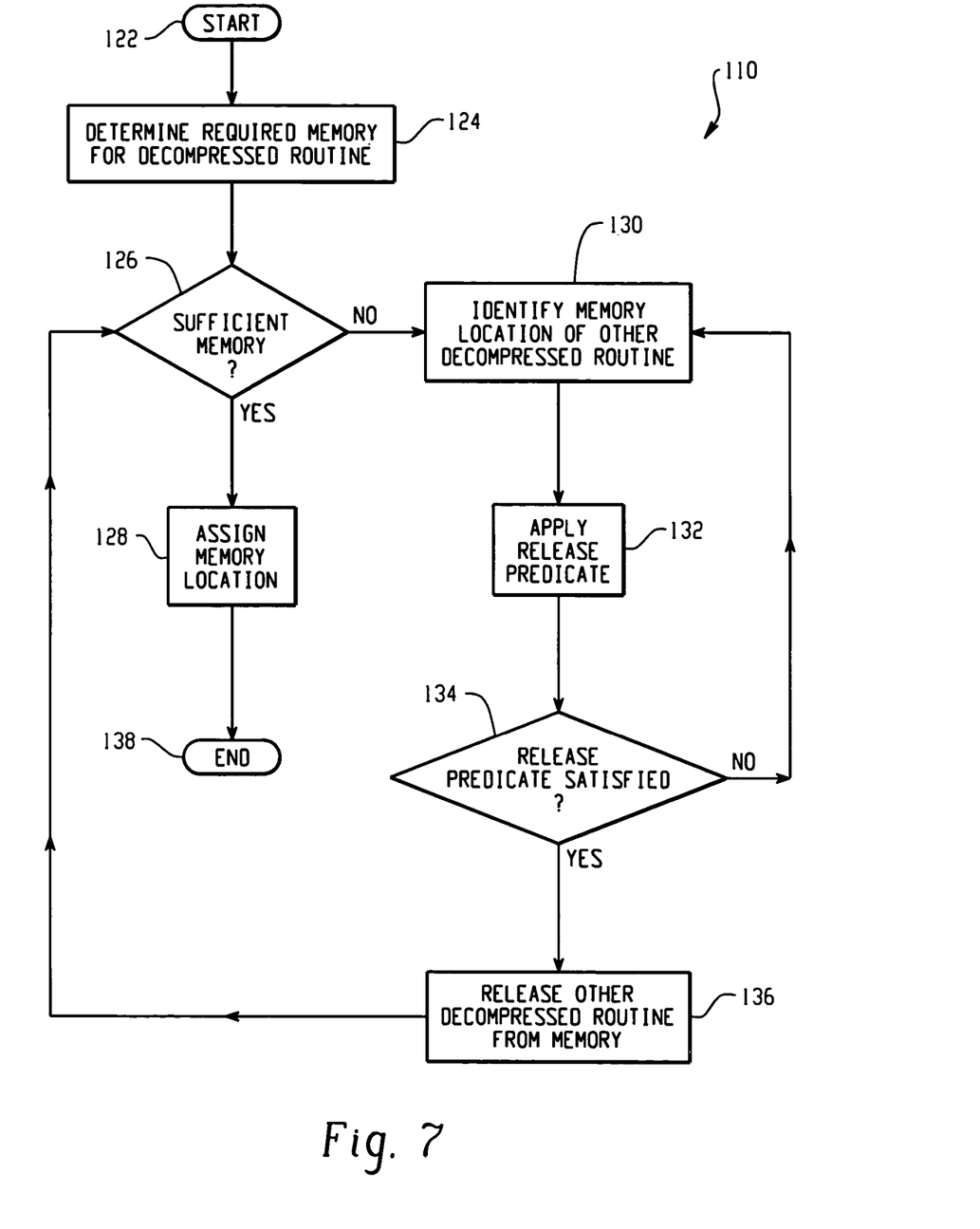
FIG. 7 is a flow diagram illustrating an example method for allocating memory on a mobile device for decompressed software routines.

FIG. 7 is a flow diagram illustrating an example method for allocating memory on a mobile device for decompressed software routines. The method begins at step 122 when a compressed software routine is accessed by the mobile device. At step 124, the amount of memory that will be required to store the routine once it has been decompressed is determined. If there is sufficient active memory to store the decompressed software routine (step 126), then an active memory location is assigned in step 128, and the method ends at step 138. If there is not sufficient active memory to store the decompressed software routine (step 126), however, then the method proceeds to step 130.

In steps 130-134, a release predicate is applied to any decompressed software routines currently stored in active memory in order to select a decompressed software routine that can be released from active memory to make room for the newly accessed routine. This function may, for example, be performed by the memory allocation module 52, described above with reference to FIG. 3. In step 130, the decompressed software routines in active memory are identified. Then, the release predicate 132 is successively applied to each decompressed software routine in active memory (step 132) until a routine is identified that satisfies the predicate (step 134). For example, in one embodiment, the release predicate may identify the decompressed software routine that has been stored in active memory for the longest amount of time. Once a decompressed software routine has been identified using the release predicate, the identified routine is released from active memory in step 136, and the method returns to step 126.

Figure 8:
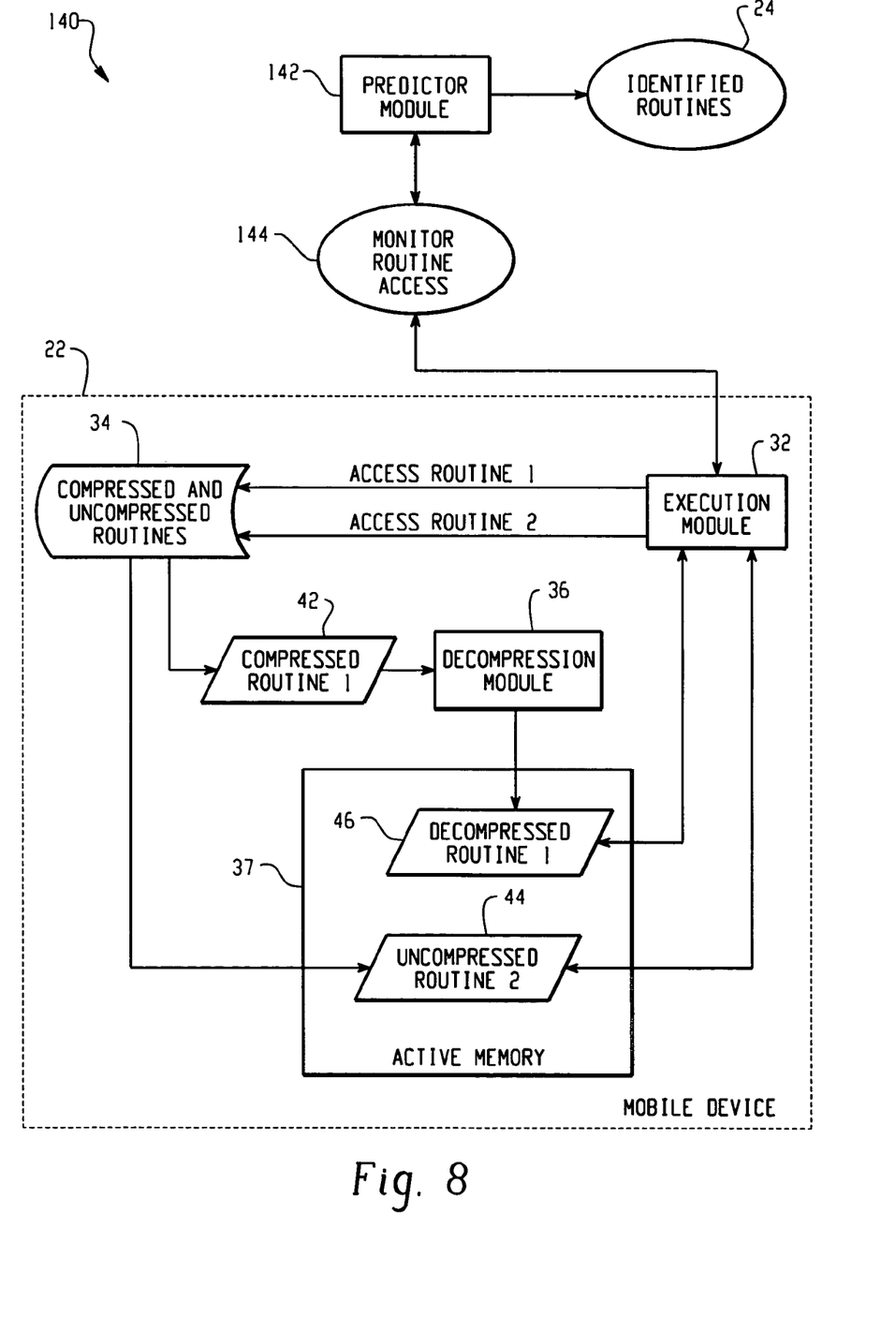
FIG. 8 illustrates one alternative embodiment in which software routines to be compressed are identified by monitoring the frequency in which such software routines are accessed by a functioning mobile device.

This written description uses examples to disclose the invention, including the best mode, and also to enable a person skilled in the art to make and use the invention. The patentable scope of the invention may include other examples that occur to those skilled in the art. For example, FIG. 8 illustrates an example embodiment 140 in which the software routines that are to be compressed are identified by monitoring via program 144 the frequency in which such routines are accessed by the execution module 32 on a mobile device 22. In FIG. 8, the predictor module 142 is coupled to a mobile device 22 and monitors 144 the mobile device 22 to determine how often each software routine 34 stored on the mobile device 22 is accessed by the execution module 32. Stored software routines 34 that are accessed by the execution module 32 less than a pre-determined number of times may then be identified 24 by the predictor module 142. The identified routines 24 may then be compressed when installed on other mobile devices 22.

It is claimed:

1. A system for reducing the size of a device application to be loaded onto a mobile device, comprising:
   a processor;
   a predictor module executable by the processor to apply a predicate to the plurality of software routines, the predicate being a function operable to identify a pre-determined feature within one or more of the software routines; and
   a compression module executable by the processor to compress the identified software routine to generate a compressed software routine;
   wherein the mobile device is to decompress the compressed software routine when the compressed software routine is to be accessed on the mobile device;
   wherein the pre-determined feature is a reserved word;
   wherein the pre-determined feature is indicative of a software routine less likely to be executed repeatedly on the mobile device.

2. The system of claim 1, wherein the pre-determined feature is indicative of a software routine that is unlikely to be executed more than once on the mobile device.

3. The system of claim 1, wherein the reserved word indicates that the identified software routine is a static initializer routine.

4. The system of claim 3, wherein the identified software routine is a static initializer method denoted by the reserved word <clinit> in a Java classfile.

5. The system of claim 1, wherein the pre-determined feature identifies a C++ static initializer function.

6. The system of claim 1, wherein the pre-determined feature identifies a C++ static finalizer function.

7. The system of claim 1, wherein the predicate is a two-tiered function that returns either true or false.

8. The system of claim 1, wherein the predicate is a multi-tiered function.

9. The system of claim 1, wherein the plurality of software routines are Java methods.

10. The system of claim 1, wherein the plurality of software routines are Java class files.

11. The system of claim 1, wherein the pre-determined feature is identified based on a functional analysis of the mobile device.

12. The system of claim 1, wherein the compression module applies a lossless compression scheme to generate the compressed software routine.

13. In a system for reducing the size of software stored in a mobile device by applying a predicate function to a plurality of software routines to identify a pre-determined feature within one or more of the software routines and compressing one or more of the software routines that are identified by the predicate function prior to loading the software routines onto the mobile device, the mobile device comprising:
  a memory device operable to store the software routines, including the one or more compressed software routines;
  a decompression module configured to decompress the compressed software routines stored in the memory device; and
  an execution module operable to access the memory device to execute the software routines stored in the memory device, wherein if the execution module accesses one of the compressed software routines stored in the memory device, then the one compressed software routine is decompressed by the decompression module prior to execution by the execution module;
  wherein the pre-determined feature is a reserved word;
  wherein the pre-determined feature is indicative of a software routine that is less likely to be executed repeatedly on the mobile device.

14. The mobile device of claim 13, further comprising:
  a memory allocation module that stores the decompressed software routine to a memory location in the memory device.

15. The mobile device of claim 14, wherein the memory allocation module monitors the execution of the decompressed software routine by the execution module and releases the decompressed software routine from the memory location in the memory device when the execution module completes its execution of the decompressed software module.

16. The mobile device of claim 14, wherein if there is insufficient memory available in the memory device to store the decompressed software routine, then the memory allocation module frees memory space in the memory device by releasing another decompressed software routine based on a pre-determined release criteria.

17. The mobile device of claim 13, wherein the memory device is a persistent memory device, and further comprising:
  an active memory device for storing executing software routines, wherein software routines that are decompressed by the decompression module are stored to the active memory device for execution by the execution module.

18. The mobile device of claim 17, further comprising:
  a memory allocation module that stores the decompressed software routine to the active memory device.

19. The mobile device of claim 13, wherein the memory device includes an active memory segment and a persistent memory segment, the software routines being stored in the persistent memory segment, and wherein software routines that are decompressed by the decompression module are stored to the active memory segment for execution by the execution module.

20. The mobile device of claim 19, wherein the memory device is a flash EEPROM.

21. The mobile device of claim 13, wherein the execution module is a virtual machine executing on a processor in the mobile device.

22. The mobile device of claim 13, wherein the decompression module is a software module executing on a processor in the mobile device.

23. The mobile device of claim 13, wherein the mobile device is a wireless device operable to receive data over a wireless network.

24. In a system for reducing the size of software stored in a mobile device by applying a predicate function to a plurality of software routines to identify a pre-determined feature within one or more of the software routines and compressing one or more of the software routines that are identified by the predicate function prior to loading the software routines to the mobile device, a method for executing the one or more compressed software routines on the mobile device, comprising the steps of:
  storing the one or more compressed software routines in a persistent memory location;
  accessing one of the compressed software routines for execution by the mobile device;
  decompressing the one accessed compressed software routine;
  storing the resultant decompressed software routine in the allocation active memory location; and
  executing the decompressed software routine;
  wherein the pre-determined feature is a reserved word;
  wherein the pre-determined feature is indicative of a software routine that is unlikely to be executed repeatedly on the mobile device.

25. The method of claim 24, comprising the addition steps of:
  determining if there is sufficient memory available in the active memory location to store the decompressed software routine; and
  if sufficient memory is not available, then selecting another decompressed software routine to release from the active memory location.

26. A system for reducing the size of software for use in a mobile device, comprising:
  a memory device for storing a plurality of software routines that are to be loaded onto the mobile device;
  means for identifying a pre-determined feature within one or more of the software routines;
  means for compressing the identified software routine to generate a compressed software routine; and
  means for installing the plurality of software routines, including the compressed software routine, onto the mobile device;
  wherein the mobile device decompresses the compressed software routine when the compressed software routine is accessed by an execution thread on the mobile device;
  wherein the pre-determined feature is a reserved word;
  wherein the pre-determined feature is indicative of a software routine that is unlikely to be executed repeatedly on the mobile device.

27. In a system for reducing the size of software stored in a mobile device by applying a predicate function to a plurality of software routines to identify a pre-determined feature within one or more of the software routines and compressing one or more of the software routines that are identified by the predicate function prior to loading the software routines to the mobile device, the mobile device comprising:
  a memory device operable to store the software routines, including the one or more compressed software routines;
  means of decompressing the compressed software routines stored in the memory device; and means for accessing the memory device to execute the software routines stored in the memory device;

wherein if one of the compressed software routines stored in the memory device is accessed, then the one compressed software routine is decompressed prior to being executed;

wherein the pre-determined feature is a reserved word;

wherein the pre-determined feature is indicative of a software routine that is unlikely to be executed repeatedly on the mobile device.

* * * * *